Jan. 12, 1960
R. E. KING ET AL
2,921,261
AUTOMATIC PHASE MEASURING SYSTEM
Filed April 1, 1957
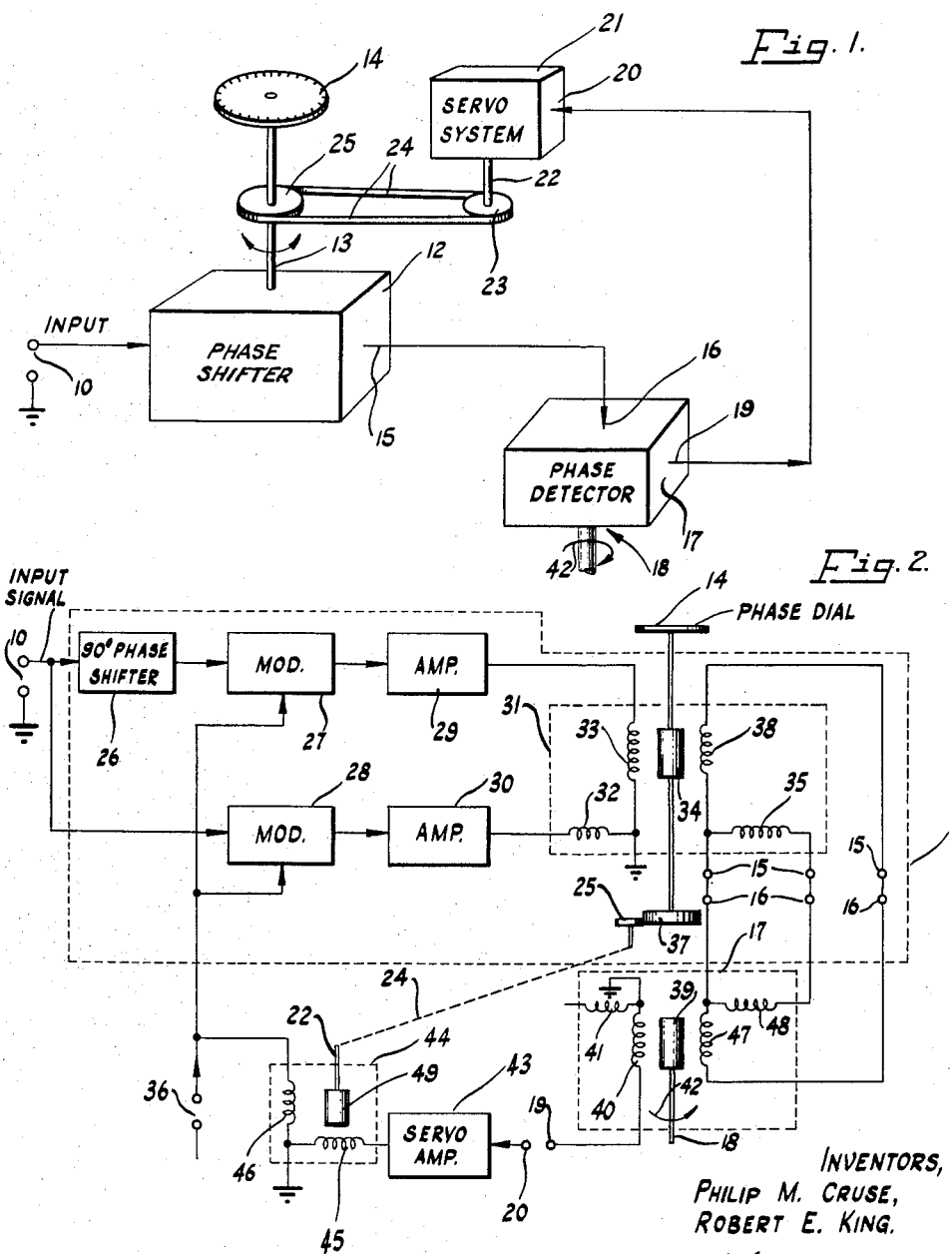
INVENTORS,
PHILIP M. CRUSE,
ROBERT E. KING.
BY
AGENT United States Patent Office 2,921,261
Patented Jan. 12, 1960

2,921,261
AUTOMATIC PHASE MEASURING SYSTEM

Robert E. King, Santa Monica, and Philip M. Cruse, Santa Barbara, Calif., assignors to Hughes Aircraft Company, Culver City, Calif., a corporation of Delaware Application April 1, 1957, Serial No. 650,047

8 Claims. (Cl. 324—83)

This invention relates to phase measuring systems and more particularly to an automatic phase measuring system of high accuracy.

In the prior art where repeated or continuous accurate measurement of the phase relationship between a pair of low-frequency alternating-current signals has been necessary, the two signals have been applied to the horizontal and vertical input terminals of an oscillograph and the resulting Lissajou patterns observed. These observations can be made with a high degree of accuracy by a well trained observer but require considerable personal judgment by the observer and individual adjustment of instruments for each reading.

This invention contemplates a continuous rapid and accurate automatic phase measuring system involving the use of induction resolvers driven by a servomotor, for the measurement of phase difference for frequencies as low as ¼ cycle per second or lower depending on the capabilities of the associated equipment. The system is dependent only on induction resolvers for calibration and operates on null-balance principles. It is particularly adaptable to measurement of phase differences between an electrical signal and an equivalent mechanical motion.

Accordingly it is an object of this invention to provide an automatic, continuously operating phase measuring system.

It is another object of this invention to provide an automatic phase measurement system for very low frequencies of the order of a few cycles per second applicable to measurement of phase difference between an electrical signal and an equivalent mechanical motion.

It is still another object of this invention to provide an automatic, continuously operating phase measurement system for measuring the phase difference between an electrical signal and a mechanical signal independently of the amplitudes thereof.

These and other objects of this invention may be further obtained from the following specification and claims when taken together with the drawing in which:

Fig. 1 is partially a block and partially a mechanical diagram of an automatic phase measurement system according to this invention; and Fig. 2 is a combination block and circuit diagram illustrating further details of the system shown in Fig. 1.

A simplified block diagram of this invention is shown in Fig. 1 to illustrate the basic principle involved therein.

Input terminals 10 are provided for the application of signals of unknown phase relation to a mechanical reference signal. Input terminals 10 are connected to a block 12 which represents a phase shifter and includes additional circuits and a resolver driven by these circuits which are further delineated below. The elements within block 12 are mechanically coupled by a driving shaft 13 to a phase indicator dial 14. An output connection 15 is made between block 12 and an input connection 16 to a phase detector 17. Another input in the form of a mechanical rotation of a shaft 18 is provided for phase detector 17 by which mechanical reference signals may be applied to phase detector 17. These input signals may represent a mechanical motion. An output connection 19 from phase detector 17 is provided to connect phase detector 17 to a servomotor system 21. The details of servomotor system 21 are further specified below. Servomotor system 21 has an output shaft 22 to which a drive pulley 23 is attached. Drive pulley 23 is coupled mechanically as by a belt 24 to a driven pulley 25 on shaft 13 of phase shifter 12. Other mechanical coupling means are possible so that the means indicated in the figure should be considered as merely representative. For example, a gear system may be employed to couple the output shift 22 of the servomotor 21 to the shaft 13 of the phase shifter 12.

The operation of the system of this invention is further described below.

Referring now to Fig. 2 wherein further details of the invention are shown the elements included within the block 12 of Fig. 1 are shown in the dashed-in area 12 of Fig. 2. Input terminals 10 in Fig. 2 are connected to a 90° phase shift network 26 and to a first modulator 28. Phase shift network 26 is coupled to a second modulator 27. Modulators 27 and 28 are each connected to a source of carrier frequency signals connected to input terminals 36. Modulator 27 is connected to an amplifier 29 while modulator 28 is connected to an amplifier 30. Amplifier 29 is connected to a first stator winding 33 of a first resolver indicated by dashed line 31. Amplifier 30 is connected to a second stator winding 32 of resolver 31. Output windings 38 and 35 are provided on resolver 31 to deliver output signals at output terminals 15. The rotor 34 of resolver 31 moves with windings 38 and 35. Rotor 34 has coupled to it at one end a phase indicator dial 14. A drive gear 37 is connected at the other end. Output terminals 15 of resolver 31 are connected to input terminals 16 of phase detector-resolver 17. Input terminals 16 are connected to input windings 47 and 48 of resolver 17.

Rotor 39 of resolver 17 and windings 41 and 40 thereof move together. Rotor 39 has means 18 such as a shaft to which a mechanical rotary motion may be applied. This motion may be derived from any suitable source of such motion or from a linkage by which another form of mechanical movements is converted to rotary motion. Only one output winding 40 of resolver 17 is utilized since quadrature voltages are not required. Winding 41 is unconnected and not used. Output terminal 19 of phase-detector resolver 17 is connected to input terminal 20 of a servo amplifier 43. Servo amplifier 43 is connected to a two phase induction servomotor 44. Servomotor 44 and servo amplifier 43 comprise the servo system of block 21 in Fig. 1. Servo amplifier 43 drives servomotor 44. Servomotor 44 has a fixed phase winding 46 connected to carrier signal source 36 and a driving phase winding 45 connected to the output of servo amplifier 43.

The operation of the phase measuring system of this invention may be seen to be as follows, reference being had to the figures:

An electrical signal is applied at input terminals 10. This signal may be a sine wave of low frequency derived from a system, the phase of which is to be tested or observed. In practical applications signals of a frequency less than five cycles per second derived from some servomechanism error signal source or from a source of steering signals in a navigation or flight control system may be applied to terminals 10. The signal from terminals 10 is applied to 90° phase shifter 26 and to modulator 28. From the output of phase shifter 26 another signal is applied to modulator 27. The new signal applied to modulator 27 is shifted 90° in phase with respect to the first signal applied to modulator 28. A carrier signal applied to terminals 36 is applied also to both modulators 27 and 28 respectively.

Phase shifter 26 may be of a type found in page 193 Fig. 5.31 of "Electronic Analog Computers" by Korn and Korn published 1948 by McGraw-Hill Book Co., Inc., New York. The modulators 27 and 28 are each respectively of the switch type described on page 380, Fig. 12.9 of "Electronic Instruments" by Greenwood, Holdam and MacRae, vol. 21 of the M.I.T. Radiation Laboratory, Series published by McGraw-Hill Book Co., Inc., of New York, 1948. The input signal is applied to a switch, not shown, but included in block 27 or 28, which is vibrated at the carrier frequency by the carrier signal to alternately apply the signal to each of a push-pull pair of cathode followers. The cathode followers, in each modulator, also not shown, but included in blocks 27 and 28, have a low pass filter output circuit in which a resultant output carrier signal modulated at the low error signal frequency is generated. The resultant low-frequency modulated-carrier output signal from modulator 27 or 28, respectively, is applied to amplifiers 29 or 30 respectively. The low-frequency modulated-carrier output signals from amplifier 29 are applied to input winding 33 of induction resolver 31. The modulation component of the output signals from amplifier 30 are shifted 90° in phase with respect to the modulation component of the signals from amplifier 29. The low frequency modulated carrier signals from the output of amplifier 30 are applied to input winding 32 of resolver 31.

Rotor 34 and output windings 38 and 35 of resolver 31 may be integral. The position of rotor 34 will determine the phase of the signal induced in output windings 38 and 35 from input windings 32 and 33. At an appropriate position of rotor 34 the induced signal in windings 38 and 35 will be zero. That is, when the signal resulting from the position of rotor 34 is nulled, the reference shaft motion will have a zero phase relationship to the input electrical signal.

A rotating magnetic field is set up in resolver 31 due to the application of signals from amplifiers 29 and 30 to windings 33 and 32. These signals are 90° out of phase with one another. The magnetic field is rotating at a rate corresponding to the low signal frequency and is varying in amplitude at the carrier frequency. Depending upon the position of rotor 34 the signals induced in windings 38 and 35 will also develop a rotating magnetic field whose rotation either leads or lags that of the magnetic field produced by windings 33 and 32. The field of windings 38 and 35, established by the impressment thereon of the electrical signal on the windings 47 and 48 of phase detector resolver 17 thru the interconnections of terminals 15, 16, also rotates. Now if rotor 39 of resolver 17 is rotated at the same speed as the rotating magnetic field due to the reference motion applied to it, a voltage will be induced in winding 40 depending on the sine or cosine of the mechanical angle between the axis of the rotor winding 40 and the vector describing the rotating magnetic field. If this angle is 90°, zero voltage will be induced and a null will have been reached (cos 90° = 0).

The vector of the rotating field can be advanced or retarded to produce the null by rotating rotor 34. This is done by the servometer 44 through linkage 24 in response to the signal from winding 40 of phase detector 17.

If there is a phase difference output signal developed in winding 40 of phase detector resolver 17, the output signal appears at output terminal 19 of resolver 17 and is applied to input terminal 20 of servo amplifier 43 of known design. The amplified phase difference signal is applied to drive winding 45 of servomotor 44. Reference signals from source 36 are applied to the reference phase winding 46 of servomotor 44.

The rotor 49 of servomotor 44 in the presence of a phase difference signal is rotated to drive shaft 22 coupled by mechanical linkage 24 to drive gear 25. Gear 25 drives gear 37 to rotate rotor 34 of resolver 31 until the phase difference signal at winding 40 of resolver 17 is zero. Dial 14 may be set initially to a zero or reference position and watched continuously or connected to a recording device so that a continuous observation or record may be made of the phase difference between a mechanical motion applied at input 18 of resolver 17 and an electrical signal applied at terminals 10 which should correspond to this mechanical motion. The mechanical motion may be that of any indicating or follow-up device, or the motion producing the input to the system of which signal 10 is the error or output signal.

There has been described above a system for the continuous measurement and indication of the phase difference between an electrical signal derived from a source of error signals or steering signals derived from a system (such as a tracking servo) which should follow a particular mechanical input motion. The mechanical motion is applied as a reference signal.

What is claimed as new is:

1. An automatic and continuously operating system for measuring the phase difference between an electrical input signal and a mechanical reference signal comprising: phase shifting means for receiving the electrical input signal and adapted to develop therefrom a pair of signals in phase quadrature; first resolver means coupled to said phase shifting means and having a phase difference indicator, said indicator having driving means for positioning said indicator; second resolver means coupled to said first resolver means and adapted to receive the mechanical reference signal, said second resolver means being further adapted to develop an error signal indicative of any difference in phase between the electrical input signal and the mechanical reference signal; and an error signal responsive servomechanism coupled between said second resolver means and said driving means of said first resolver means to rotate said indicator until a zero error signal is obtained from said second resolver means.

2. An automatic and continuously operating system for measuring the phase difference between an electrical input signal and a mechanical reference signal comprising: phase shifting means for receiving the electrical input signal and adapted to develop therefrom a pair of signals in phase quadrature; resolver means coupled to said phase shifting means and having a phase difference indicator, said indicator having driving means for positioning said indicator; phase detector means coupled to said resolver means and adapted to receive the mechanical reference signal, said phase detector means being further adapted to develop an error signal indicative of any difference in phase between the electrical input signal and the mechanical reference signal; and an error signal responsive servomechanism coupled between said phase detector means and said driving means of said resolver means to rotate said indicator until a zero error signal is obtained from said phase detector means.

3. An automatic phase measuring system comprising: an input circuit for receiving electrical input signals; phase shifting means coupled to said input circuit and adapted to derive a pair of signals in phase quadrature from said electrical input signals; a first resolver having a first pair of input windings coupled to said phase shifting means for impressing said signals in phase quadrature on said first input windings, a first rotor and a first pair of output windings coupled to said first rotor, said rotor having indicator means attached thereto for indicating the difference in phase between said signals to be measured and a mechanical reference signal; a second resolver having a second pair of input windings coupled to said first pair of output windings, a second output winding, and a second rotor coupled to said second output winding, said second rotor having an input shaft for receiving the mechanical reference signal; and a servomotor system coupled between said first and second resolvers and responsive to signals from said second output winding of said second resolver to drive said first rotor whereby any phase difference between said electrical input signals and said mechanical reference signal will be reduced to zero by the operation of said servomotor system in response to said phase difference and whereby said indicator means shows the phase difference between said electrical input signals and said mechanical reference signal.

4. An automatic phase measuring system comprising: an input circuit for receiving electrical input signals; phase shifting means coupled to said input circuit and adapted to derive a pair of signals in phase quadrature from said electrical input signals, a resolver having a pair of input windings coupled to said phase shifting means for impressing said signals in phase quadrature on said input windings, a first rotor and a pair of output windings coupled to said first rotor, said first rotor having indicator means attached thereto for indicating the difference in phase between said electrical input signals and a mechanical reference signal; a phase detector having a pair of input windings coupled to said output windings of said resolver, an output winding, and a second rotor coupled to said output winding, said second rotor having an input shaft for receiving the mechanical reference signal and adapted for developing an error signal in said output winding; and a servomotor system coupled between said resolver and said phase detector and responsive to said error signal from said phase detector to drive said first rotor, whereby any phase difference between said electrical input signal and said mechanical reference signal will be exhibited on said indicator means.

5. An automatic phase measuring system comprising: a first input circuit for receiving signals to be measured, a phase shifter coupled to said first input circuit; modulating means coupled to said phase shifter and to said first input circuit to develop signals in phase quadrature therefrom; a second input circuit for receiving carrier signals coupled to said modulating means, said modulating means being adapted to develop carrier signals modulated by said signals in phase quadrature; first resolver means coupled to said modulating means and having phase indicating means, said first resolver means being adapted to respond to said signals in phase quadrature applied thereto from said modulating means to develop an output signal corresponding to said signals to be measured; second resolver means coupled to said first resolver means and adapted to receive said output signal, to receive a mechanical reference signal, and to develop an error signal corresponding to the phase difference between said output signal and said mechanical reference signal; and servomotor means coupled between said second resolver means and said first resolver means, whereby said error signal operates said servomotor means to actuate said phase indicating means so long as any difference in phase exists between said signals to be measured and said mechanical reference signal, the final indication thereof compared to a reference indication being the measure of phase difference between said signal to be measured and said mechanical reference signal.

6. An automatic phase measuring system comprising: a first input circuit for receiving signals to be measured, a phase shifter coupled to said first input circuit; modulating means coupled to said phase shifter and to said first input circuit to develop signals in phase quadrature therefrom; a second input circuit for receiving carrier signals coupled to said modulating means, said modulating means being adapted to develop carrier signals modulated by said signals in phase quadrature; resolver means coupled to said modulating means and having phase indicating means, said resolver means being adapted to respond to said signals in phase quadrature applied thereto from said modulating means to develop an output signal corresponding to said signals to be measured; phase detector means coupled to said resolver means and adapted to receive said output signal, to receive a mechanical reference signal, and to develop an error signal corresponding to the phase difference between said output signal and said mechanical reference signal; and servomotor means coupled between said resolver means and said phase detector means, whereby said error signal operates said servomotor means to actuate said phase indicating means so long as any difference in phase exists between said signals to be measured and said mechanical reference signal, the final indication thereof compared to a reference indication being the measure of phase difference between said signal to be measured and said mechanical reference signal.

7. An automatic phase measuring system comprising: a first input circuit for receiving input signals the phase of which is to be measured; a phase shifter for developing a signal shifted 90° in phase with respect to said input signals to be measured; a first and a second modulator adapted to generate modulated carrier signals, said first modulator being coupled to said phase shifter, said second modulator being coupled to said first input circuit; a second input circuit for receiving carrier signals coupled to both of said modulators, whereby said first modulator develops a carrier signal modulated by said input signal to be measured and said second modulator develops a carrier signal modulated by said 90° phase shifted signal; a first and a second amplifier coupled respectively to said first and second modulators; a first resolver having a first pair of input windings coupled to said amplifiers and adapted to respond to signals in phase quadrature applied thereto from said amplifiers, a first rotor and a first pair of output windings coupled thereto, said first rotor having indicator means attached thereto for indicating phase difference between said signal to be measured and a mechanical reference signal, and a drive control means; a second resolver having a second pair of input windings coupled to said first pair of output windings of said first resolver, at least a second output winding and a second rotor coupled to said second output winding, said second rotor having an input shaft for receiving the mechanical reference signal; and a servomotor system having an input circuit coupled to said second output winding and a servo output connection coupled to said drive control means of said first resolver for moving said indicator means, whereby any phase difference between said input signal to be measured and said mechanical reference signal is reduced to zero by the operation of said servomotor system to generate an indication on said indicator means, the indication being the measure of phase difference between said input signal to be measured and said mechanical reference signal.

8. An automatic phase measuring system comprising: a first input circuit for receiving input signals, the phase of which is to be measured; a phase shifter for developing a signal shifted 90° in phase with respect to said input signals to be measured; a first and a second modulator adapted to generate modulated carrier signals, said first modulator being coupled to said phase shifter, said second modulator being coupled to said first input circuit; a second input circuit for receiving carrier signals coupled to both of said modulators, whereby said first modulator develops a carrier signal modulated by said input signals to be measured and said second modulator develops a carrier signal modulated by said 90° phase-shifted signal; a first and a second amplifier coupled, respectively, to said first and second modulators; a resolver having a pair of input windings coupled to said amplifiers and adapted to respond to signals in phase quadrature applied thereto from said amplifiers, a first rotor and a pair of output windings coupled to said first rotor, said first rotor having indicator means attached thereto for indicating phase difference between said signals to be measured and a mechanical reference signal, and having a drive control means; a phase detector having an input circuit coupled to said output windings of said resolver, an output circuit, and a second rotor coupled to said output circuit, said second rotor having an input shaft for receiving the mechanical reference signal; and a servomotor system having an input circuit coupled to said output circuit, and a servo output connection coupled to said drive control means for moving said indicator means, whereby any phase difference between said input signal to be measured and said mechanical reference signal is reduced to zero by the operation of said servomotor system to generate an indication on said indicator means, the indication being the measure of phase difference between said input signal to be measured and said mechanical reference signal.

No references cited.